United States Patent
Martinez Tarradell et al.

(10) Patent No.: US 10,849,163 B2
(45) Date of Patent: *Nov. 24, 2020

(54) RANDOM ACCESS PROCEDURE FOR ENHANCED COVERAGE SUPPORT

(71) Applicant: Apple Inc., Cupertino, CA (US)

(72) Inventors: Marta Martinez Tarradell, Hillsboro, OR (US); Hyung-Nam Choi, Hamburg (DE); Debdeep Chatterjee, San Jose, CA (US); Richard Burbidge, Shrivenham (GB); Youn Hyoung Heo, San Jose, CA (US); Umesh Phuyal, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/881,082

(22) Filed: Jan. 26, 2018

(65) Prior Publication Data
US 2018/0152968 A1 May 31, 2018

Related U.S. Application Data

(63) Continuation of application No. 14/861,828, filed on Sep. 22, 2015, now Pat. No. 9,918,344.
(Continued)

(51) Int. Cl.
*H04W 74/08* (2009.01)
*H04L 1/08* (2006.01)
(Continued)

(52) U.S. Cl.
CPC .......... *H04W 74/0833* (2013.01); *H04L 1/00* (2013.01); *H04L 1/08* (2013.01); *H04W 74/006* (2013.01); *H04W 52/22* (2013.01)

(58) Field of Classification Search
CPC ...... H04W 72/04; H04W 88/08; H04W 76/00
See application file for complete search history.

(56) References Cited

U.S. PATENT DOCUMENTS 8,768,385 B2   7/2014   Chandramouli et al.
9,065,616 B2   6/2015   Park et al.
(Continued)

FOREIGN PATENT DOCUMENTS

CN   101420292   4/2009
CN   102158329   8/2011
(Continued)

OTHER PUBLICATIONS

Martinez-Tarradell et al., "Methods to Communicate the UE Category-0 Support to RAN Nodes," filed May 8, 2014 assigned as U.S. Appl. No. 61/990,685.
(Continued)

*Primary Examiner* — Hassan A Phillips
*Assistant Examiner* — Prenell P Jones
(74) *Attorney, Agent, or Firm* — Fish & Richardson P.C.

(57) ABSTRACT

Embodiments described herein relate generally to a communication between a user equipment (UE) and an evolved Node B (eNB) that are both running in Enhanced Coverage (EC) mode. The UE and eNB may communicate in a contention-based random access procedure having an EC level that may be used to determine the number of times an RA preamble may be sent, and one or more RA response opportunity windows that may be used to receive one or more RA responses. Other embodiments may be described and/or claimed.

20 Claims, 10 Drawing Sheets

Related U.S. Application Data

(60) Provisional application No. 62/145,335, filed on Apr. 9, 2015.

(51) Int. Cl.
    *H04L 1/00*      (2006.01)
    *H04W 74/00*     (2009.01)
    *H04W 52/22*     (2009.01)

(56) References Cited

U.S. PATENT DOCUMENTS

| | | | |
|---|---|---|---|
| 9,648,582 | B2 | 5/2017 | Burbidge et al. |
| 9,668,280 | B2* | 5/2017 | Wu .................... H04W 74/0833 |
| 9,787,435 | B2* | 10/2017 | Yasukawa ............. H04L 1/0061 |
| 9,794,949 | B2* | 10/2017 | Bhargava ................ H04K 3/222 |
| 9,918,344 | B2 | 3/2018 | Martinez Tarradell et al. |
| 10,172,127 | B2 | 1/2019 | Chatterjee et al. |
| 10,182,457 | B2* | 1/2019 | Wang ................ H04W 74/0833 |
| 2004/0192257 | A1 | 9/2004 | Stenberg |
| 2009/0168723 | A1 | 7/2009 | Meylan |
| 2010/0210255 | A1* | 8/2010 | Amirijoo ............ H04W 74/002 |
| | | | 455/419 |
| 2011/0305213 | A1 | 12/2011 | Lohr et al. |
| 2013/0035084 | A1 | 2/2013 | Song et al. |
| 2013/0051214 | A1 | 2/2013 | Fong et al. |
| 2013/0058311 | A1 | 3/2013 | Park et al. |
| 2013/0067293 | A1 | 3/2013 | Somasundaram et al. |
| 2013/0094385 | A1 | 4/2013 | Gunnarsson et al. |
| 2013/0242889 | A1 | 9/2013 | Khoryaev et al. |
| 2014/0071856 | A1 | 3/2014 | Brisebois et al. |
| 2014/0098761 | A1* | 4/2014 | Lee .................... H04W 74/006 |
| | | | 370/329 |
| 2014/0198685 | A1 | 7/2014 | Xu et al. |
| 2014/0233470 | A1 | 8/2014 | Kim et al. |
| 2014/0302234 | A1 | 10/2014 | Conroy et al. |
| 2014/0362832 | A1 | 12/2014 | Rudolf et al. |
| 2014/0370812 | A1 | 12/2014 | Mauney et al. |
| 2015/0016312 | A1 | 1/2015 | Li et al. |
| 2015/0117410 | A1* | 4/2015 | Wu ........................... H04L 1/08 |
| | | | 370/331 |
| 2015/0124746 | A1* | 5/2015 | Wu .................... H04W 74/0833 |
| | | | 370/329 |
| 2015/0131579 | A1 | 5/2015 | Li et al. |
| 2015/0181533 | A1* | 6/2015 | Chen .................... H04W 52/146 |
| | | | 455/522 |
| 2015/0249941 | A1 | 9/2015 | Wang et al. |
| 2015/0312957 | A1 | 10/2015 | Pelletier et al. |
| 2015/0327142 | A1 | 11/2015 | Martinez Tarradell et al. |
| 2015/0365914 | A1 | 12/2015 | Yu et al. |
| 2015/0373740 | A1 | 12/2015 | Eriksson et al. |
| 2016/0095076 | A1 | 3/2016 | Xiong et al. |
| 2016/0100380 | A1 | 4/2016 | Jha et al. |
| 2016/0135141 | A1 | 5/2016 | Burbidge et al. |
| 2016/0150570 | A1* | 5/2016 | Wang ................ H04W 74/0833 |
| | | | 370/329 |
| 2016/0192376 | A1 | 6/2016 | Lee et al. |
| 2016/0226639 | A1* | 8/2016 | Xiong .................... H04B 1/713 |
| 2016/0295609 | A1* | 10/2016 | Vajapeyam ............... H04L 5/14 |
| 2017/0048802 | A1* | 2/2017 | Bucknell ............... H04W 48/16 |
| 2017/0280481 | A1* | 9/2017 | Stern-Berkowitz ........................ |
| | | | H04W 74/008 |
| 2017/0303248 | A1 | 10/2017 | Chatterjee et al. |
| 2019/0037569 | A1* | 1/2019 | Lee ........................ H04W 52/50 |

FOREIGN PATENT DOCUMENTS

| | | |
|---|---|---|
| CN | 103460776 | 12/2013 |
| CN | 103929779 | 7/2014 |
| CN | 104137635 | 11/2014 |
| CN | 107078863 | 8/2017 |
| EP | 2208302 | 7/2010 |
| JP | 2009239593 | 10/2009 |
| JP | 2016518059 | 6/2016 |
| JP | 2016526836 | 9/2016 |
| KR | 20110050674 | 5/2011 |
| KR | 20140080298 | 6/2014 |
| WO | WO 2008085811 | 7/2008 |
| WO | WO 2009039404 | 3/2009 |
| WO | WO 2013112703 | 8/2013 |
| WO | WO 2013127053 | 9/2013 |
| WO | WO 2013166689 | 11/2013 |
| WO | 2014161631 A1 | 10/2014 |
| WO | WO 2014165757 | 10/2014 |
| WO | 2014206311 A1 | 12/2014 |
| WO | 2015/021318 A2 | 2/2015 |
| WO | WO 2016073118 | 5/2016 |

OTHER PUBLICATIONS

Xiong et al., "RAR Enhancement for MTC UES With Reduced Bandwidth and Enhanced Coverage," filed Nov. 6, 2014 assigned as U.S. Appl. No. 62/076,096.

Chatterjee et al., "Methods for Support of Early Termination of Repeated Transmissions for MTC UES in Enhanced Coverage Mode," filed Nov. 6, 2014 assigned as U.S. Appl. No. 62/076,198.

Burbidge et al., "RAN Paging Mechanism to Enable Enhanced Coverage Mode," filed Nov. 6, 2014 assigned as U.S. Appl. No. 62/076,382.

Partial International Search Report and Written Opinion dated Apr. 19, 2016, from International Application No. PCT/US2016/016429, 9 pages.

International Search Report and Written Opinion dated Jun. 28, 2016, from International Application No. PCT/US2016/016429, 19 pages.

Interdigital, "PRACH coverage enhancement for MTC UE," 3GPP TSG RAN WG1 Meeting #80, R1-150688, 9Agenda item: 7.2.1.2.3, th-Feb. 13, 2015, Athens, Greece, 3 pages.

Nsn et al., "PRACH Coverage Enhancement," 3GPP TSG-RAN WG1 Meeting #76, R1-140549, Agenda item: 7.2.2.2.2, Feb. 10-14, 2014, Prague, Czech Republic, 3 pages.

LG Electronics, "RACH procedure for coverage enhancement of MTC UEs," 3GPP TSG RAN WG1 #74bis, R1-134393, Agenda Item: 7.2.2.2.2, Oct. 7-11, 2013, Guangzhou, China, 3 pages.

Office Action dated Mar. 3, 2017 from U.S. Appl. No. 14/861,828, 15 pages.

Final Office Action dated Jun. 28, 2017 from U.S. Appl. No. 14/861,828, 9 pages.

Ericsson, "Revised WI: Further LTE Physical Layer Enhancements for MTC," 3GPP TSG RAN Meeting #67, RP-150492, Agenda Item: 11.3.2, Mar. 9-12, 2015, Shanghai, China, 9 pages.

3GPP, "Technical Specification Group Radio Access Network; Evolved Universal Terrestrial Radio Access (E-UTRA); Physical layer procedures (Release 12)," 3GPP TS 36.213 V12.5.0 (Mar. 2015), Lte Advanced, 239 pages.

3GPP, "Technical Specification Group Radio Access Network; Evolved Universal Terrestrial Radio Access (E-UTRA); Medium Access Control (MAC) protocol specification (Release 12)," 3GPP TS 36.321 V12.5.0 (Mar. 2015), Lte Advanced, 77 pages.

3GPP, "Technical Specification Group Radio Access Network; Evolved Universal Terrestrial Radio Access (E-UTRA); Radio Resource Control (RRC); Protocol specification (Release 12)," 3GPP TS 36.331 V12.5.0 (Mar. 2015), Lte Advanced, 445 pages.

3GPP, Technical Specification Group Radio Access Network; Evolved Universal Terrestrial Radio Access (E-UTRA) and Evolved Universal Terrestrial Radio Access Network (E-UTRAN); Overall description; Stage 2 (Release 12), 3GPP TS 36.300 V12.5.0 (Mar. 2015). Lte Advanced, 251 pages.

European Patent Office—Article 94(3) issued Feb. 5, 2019 from European Patent Application No. 16706089.6, 4 pages.

Japanese Patent Office—Non Final Notice of Reasons for Rejection dated Jul. 23, 2019 from Japanese Patent Application No. 2017-541935, 8 pages.

Panasonic, "Coverage enhancement levels for MTC," 3GPP TSG RAN WG1 Meeting #80, R1-150313, Agenda Item: 7.2.1.2.2, Feb. 9-13, 2015, Athens, Greece, 3 pages.

(56) References Cited

OTHER PUBLICATIONS

Intel Corporation, "Enhancements to RAR and paging for MTC," 3GPP TSG RAN WG1 Meeting #80, R1-150082, Agenda item: 7.2.1.2.2, Feb. 9-13, 2015, Athens, Greece, 6 pages.
3GPP, "Technical Specification Group Radio Access Network; Evolved Universal Terrestrial Radio Access Network (E-UTRAN); 51 Application Protocol (S1AP) (Release 12)," 3GPP TS 36.413 V12.3.0 (Sep. 2014), Lte Advanced, 290 pages.
3GPP, "Coverage Enhancement for PDSCH and PUSCH," 3GPP TSG RANWG1 Meeting, R1-143719, dated Sep. 27, 2014, 4 pages.
3GPP, "Coverage Enhancement for Physical Data & Control Channels," 3GPP TSG RANWG1 Meeting, R1-144076, dated Sep. 27, 2014, 5 pages.
3GPP, "Coverage Enhancement Mode Operation," 3GPP TSG RANWG1 Meeting, R1-132977, dated Aug. 10, 2013, 2 pages.
3GPP, "Coverage Enhancement Targets for MTC UE," 3GPP TSG RANWG1 Meeting, R1-133420, dated Aug. 10, 2013, 2 pages.
3GPP, "Paging Coverage Improvement Details for MTC UEs," 3GPP TSG RAN WG1 Meeting, R1-140079, dated Jan. 31, 2014, 2 pages.
3GPP, "Review of TR 25.702 V12.0.0," 3GPP TSG RANWG1 Meeting, R1-134552, dated Sep. 28, 2013, 28 pages.
3GPP, "Revised Work Item on Low Cost & Enhanced Coverage MTC UE for LTE," 3GPP TSG RAN Plenary Meeting, RP-140522, dated Mar. 6, 2014, 7 pages.
3GPP, "Technical Specification Group Radio Access Network; Evolved Universal Terrestrial Radio Access Network (E-UTRAN); X2 Application Protocol (X2AP) (Release 12)," 3GPP TS 36.423 V12.3.0 (Sep. 2014), Lte Advanced, 153 pages.
3GPP, "Technical Specification Group Radio Access Network; Study on Dedicated Channel (DCH) Enhancements for UMTS (Release 12)," 3GPP TR 25.702 V12.0.0 (Sep. 2013), Lte Advanced, 198 pages.
3GPP, "Technical Specification Group Radio Access Network; Study on Provision of Low-Cost MTC Uses Based on LTE; (Release 12)," 3GPP TR 36.888 V2.1.1 (Jun. 2013), Lte Advanced, 55 pages.
PCT International Preliminary Report on Patentability for International Appln. No. PCT/US2015/059016, dated May 9, 2017, 12 pages.
PCT International Preliminary Report on Patentability in PCT Appln. No. PCT/US2015/054230, dated May 9, 2017, 10 pages.
PCT International Preliminary Report on Patentability in PCT Appln. No. PCT/US2016/016429, dated Oct. 10, 2017, 12 pages.
PCT International Search Report and Written Opinion in International Appln. No. PCT/US2015/054230, dated Jan. 22, 2016, 12 pages.
PCT International Search Report and Written Opinion in International Appln. No. PCT/US2015/059016, dated Mar. 31, 2016, 14 pages.
Samsung, "RAPreamble Transmission for Rel-13 Low Cost UEs", 3 GPP TSG-RAN WG 1#80R1-150355, Athens, Greece, Feb. 18, 2015, 3 pages.
Sharp, "Common messages for Rel-13 MTC UEs", 3 GPP TSG-RAN WG 1#80R1-150274, Athens, Greece, Feb. 18, 2015, 3 pages.

\* cited by examiner

RANDOM ACCESS PROCEDURE FOR ENHANCED COVERAGE SUPPORT

CROSS REFERENCE TO RELATED APPLICATIONS

This application is a continuation of U.S. patent application Ser. No. 14/861,828, entitled "RANDOM ACCESS PROCEDURE FOR ENHANCED COVERAGE SUPPORT," filed Sep. 22, 2015, which claims priority under 35 U.S.C. § 119(e) to U.S. Provisional Patent Application No. 62/145,335 entitled "Random Access Procedure for Enhanced Coverage Support" and filed Apr. 9, 2015, the entire disclosures of which are incorporated herein by reference.

FIELD

Embodiments of the present disclosure relate generally to the field of wireless communications, and more particularly, to computer devices operable to implement a contention-based random access procedure.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by their inclusion in this section.

Machine-type communication (MTC) technology may enable ubiquitous computing environments as progress moves towards the concept of the "Internet of Things" (IoT). Potential MTC-based applications include smart metering, healthcare monitoring, remote security surveillance, intelligent transportation systems, individual item inventory control, and so forth. These services and applications may stimulate the design and development of a new type of MTC device that may be seamlessly integrated into current and future generation mobile broadband networks.

Existing mobile broadband networks are designed to optimize performance mainly for human-type communications. Therefore, existing networks may not be adapted or optimized for MTC-related requirements. MTC-specific designs may be explored, for example, by the Third Generation Partnership Project (3GPP). Future 3GPP specifications may support different network design, which may improve MTC.

For example, in 3GPP release 12 a new physical layer UE category, referred to as Category 0, was introduced into the E-UTRA specifications. This UE category has lower capabilities, for example in terms of peak data rate capability and in terms of transmission and reception performance due to support of only a single antenna, than the previous lowest Category 1. One of the aims for introducing Category 0 is to enable lower cost user equipment (UE) for MTC applications.

In 3GPP release 13 a new physical layer UE category (Category X) is being introduced having even lower capability and lower cost, compared to Category 0 added in release 12. In addition, an Enhanced Coverage (EC) feature is being introduced to increase the link budget by up to 15 decibels (dB). The EC feature will enable the E-UTRAN to communicate with UEs that are located in challenging locations where currently coverage cannot be provided or is difficult to provide to UEs, for example deep inside a building, in a basement, inside a pallet of goods and the like. Category X and EC are targeted to UEs primarily used for MTC applications. Category X and EC may be independently implemented and a UE may support either one or both.

BRIEF DESCRIPTION OF THE DRAWINGS

The embodiments of the disclosure are illustrated by way of example and not by way of limitation in the figures of the accompanying drawings in which like references indicate similar elements. It should be noted that references to "an" or "one" embodiment of the disclosure are not necessarily to the same embodiment, and they may mean at least one. It should also be noted that references to an "example" are references to non-limiting examples, unless otherwise stated.

DETAILED DESCRIPTION

Figure 1:
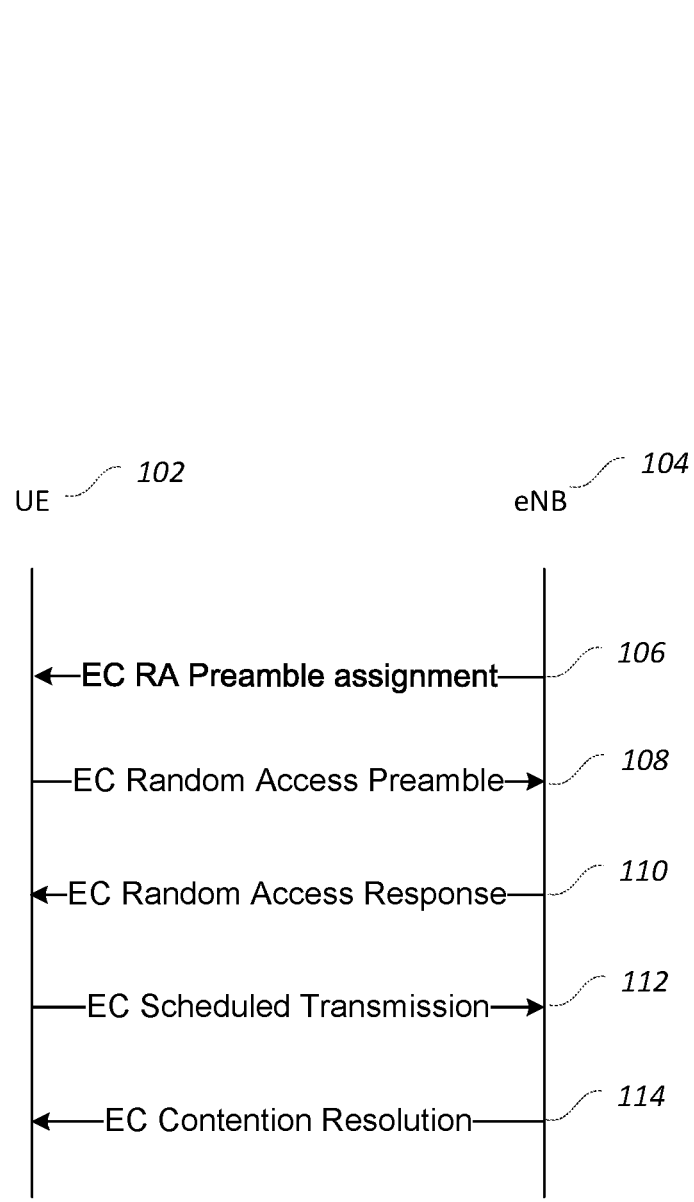
FIG. 1 illustrates a communication message flow between an evolved Node B (eNB) and a user equipment (UE) using EC mode, in accordance with various embodiments.

In the following detailed description, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality.

As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, circuitry may be implemented in, or functions associated with the circuitry may be implemented by, one or more software or firmware modules.

In embodiments, the disclosure herein may refer to processes, apparatus, and/or techniques for enhancing machine-to-machine communication related to the random access procedure process between an evolved NodeB (eNB) and a user equipment (UE) running in EC mode. These embodiments may include associating multiple levels with an EC mode, and for each level identifying a number of repetitions of messages sent between the UE and the eNB, as well as different power levels that may be used by the UE to attempt communication with an eNB depending upon the EC mode level. In addition, embodiments may include adding additional random access response (RAR) opportunity windows to receive and decode multiple RAR's that may be sent in response to multiple random access preambles. Also, embodiments may include support for a different modification period for the SI messages addressed to release-13 LC UEs and release-13 EC UEs.

In embodiments, UEs using this solution may operate in reduced bandwidth regions, such as 1.4 MHz in release-13, or may operate in more narrowband regions, such as 200 kHz. The eNB may also operate at higher system bandwidth.

FIG. 1 illustrates a communication message flow between a UE and an eNB using EC mode, in accordance with various embodiments. Diagram 100 may include a UE 102 and wireless communication with an access node such as eNB 104. The UE 102 and the eNB 104 may be in communication to establish a radio resource control (RRC) connection using a contention-based RA procedure in EC mode.

An EC random access (RA) preamble assignment 106 may be sent from the eNB 104 to the UE 102. In embodiments, the RA preamble assignment 106 may include random access configuration information related to release 13 LC (low cost) UEs and release 13 EC mode UEs and may be broadcasted through system information (SI), or may be pre-defined in the UE 102. Random access configuration information, in embodiments, may include an EC level to be used by the UE 102, a value indicating the number of additional repetitions of each EC mode message allowed for that EC level, and/or one or more power levels to be used for repeated communication attempts.

An EC RA preamble 108 may be sent from the UE 102 to the eNB 104. An EC RAR message 110 may be sent by the eNB 104 in response to the EC RA preamble 108, within an EC RAR window which, in embodiments, may be received in a plurality of contiguous subframes. The contents of the EC RA preamble 108 may determine the random access radio network temporary identifier (RA-RNTI) that the UE 102 may look for in EC RA response (EC RAR) message 110 subframes received from the eNB 104.

In embodiments, the eNB 104 may have flexibility regarding the location within the EC RAR window the EC RAR message 110 is transmitted. In embodiments, the UE 102 may search for a RA-RNTI on a physical downlink control channel (PDCCH). In embodiments, the PDCCH received by UE in EC mode may be different from legacy PDCCHs. For example, the legacy PDCCH may be sent within the whole system bandwidth in the first OFDMA symbols of a subframe. However, for EC mode, the PDCCH may be sent in reduced bandwidth region within the legacy PDCCH.

The EC RAR message 110 may include a random access preamble identifier (RAPID) and a temporary cell radio network temporary identifier (T-CRNTI).

An EC scheduled transmission 112 may be sent by the UE 102 to the eNB 104. In embodiments, if the EC RAR message 110 is received in sub-frame n, the UE 102 may send a scheduled data item via physical uplink shared channel (PUSCH) in subframe n+k, k≥6. The UE 102 may further apply Hybrid Automatic Repeat Request (HARQ) with maxHARQ-Msg3Tx. The UE 102 may also start a timer such as timer T300 for RRC connection request and monitor for T-CRNTI on PDCCH. Finally, the UE 102 may start mac-ContentionResolutionTimer. In embodiments, the mac-ContentionResolutionTimer may be restarted at each HARQ retransmission.

An EC contention resolution message 114 may be sent by the eNB 104 to the UE 102. In embodiments, the T-CRNTI is used in PDCCH and HARQ may be applied for the associated PDSCH by eNB 104. In embodiments, the UE 102 may send HARQ feedback only on PUCCH when it detects its own UE 102 identity as provided in the EC scheduled transmission 112. In embodiments, the EC contention resolution message 114 may be received by UE 102 while mac-ContentionResolutionTimer is running. If EC contention resolution message 114 is received successfully, the UE 102 Contention Resolution Identity MAC CE may contain the UL common control channel (CCCH) service data unit (SDU) of the EC contention resolution message 114.

In embodiments, advantages of the communications in EC mode described above may include a greater likelihood of an RRC connection establishment between a UE and eNB, particularly when the UE is implemented as part of IoT. Advantages may also include providing a greater likelihood of an RRC connection establishment while using less power, for example by ramping up power used by the UE to the point where the RA procedure is able to establish an RRC connection, where the UE does not have to continuously operate a maximum power. In addition, through supporting repeated attempts for transmissions between the UE and the eNB during the RA procedure, the likelihood of an RRC connection establishment is greatly increased.

Figure 2A:
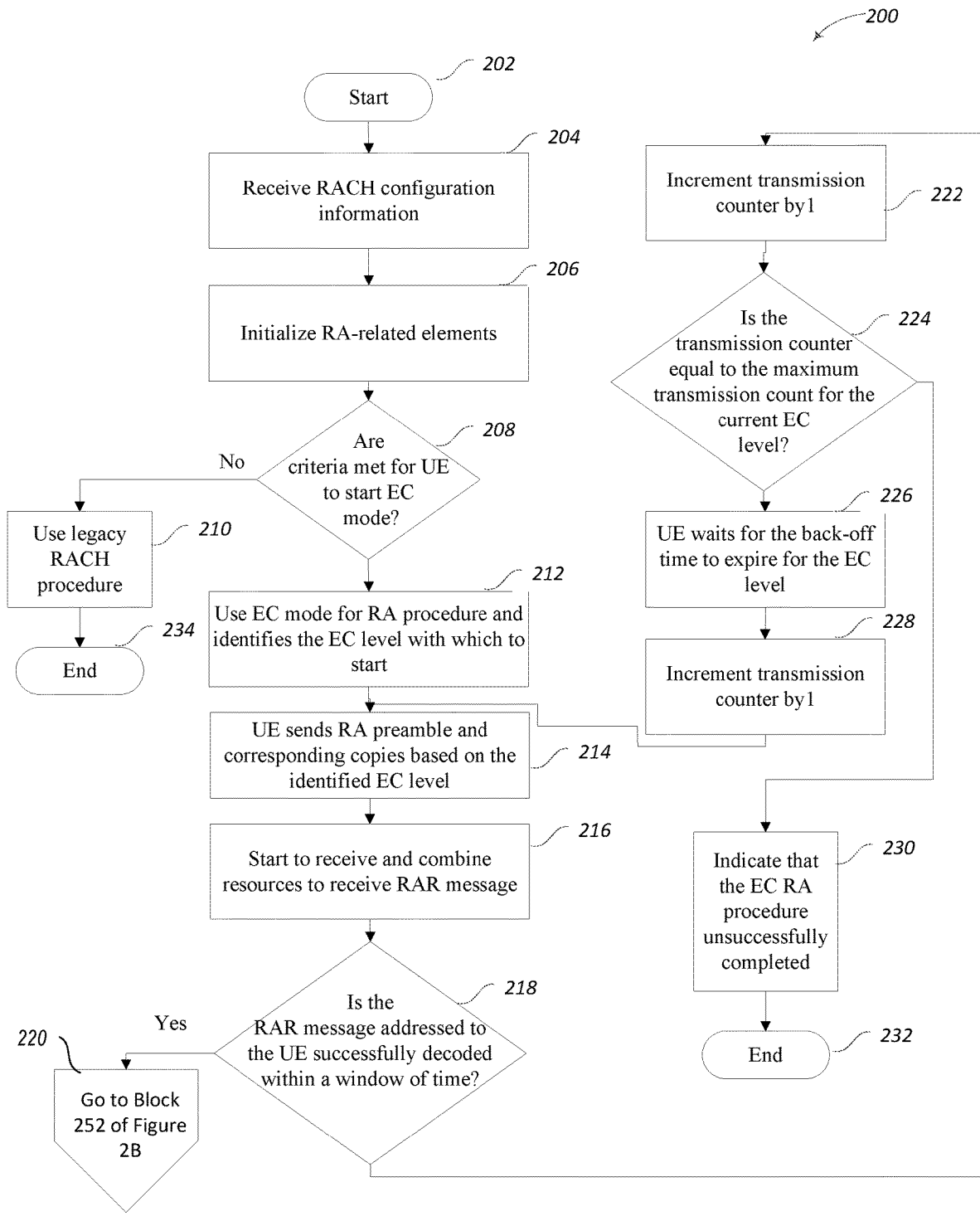
FIG. 2A illustrates a process for a contention-based random access procedure performed by a UE using EC functionality, in accordance with various embodiments.

FIG. 2A illustrates a process for a contention-based random access procedure performed by a UE using EC functionality, in accordance with various embodiments. The process 200 describes various processes described above in more detail. The process 200 may be performed by a UE, for example UE 102, used in EC mode operation in accordance with various embodiments. In some embodiments, the UE may include one or more non-transitory computer-readable media having instructions, stored thereon, that when executed cause the UE to perform the process 200.

The process may start at block 202.

At block 204, the UE 102 may receive random access procedure (RACH) configuration information from an eNB 104. In embodiments, the configuration information may be received by the UE 102 from the EC RA preamble assignment message 106, for example when the UE 102 is in idle mode and capable of EC mode. The configuration information may be broadcasted through SI by the eNB 104. In other embodiments, the configuration information may have been previously stored in the UE 102.

At block 206, the UE 102 may initialize RA related elements. In embodiments, the UE may initialize related elements similar to legacy RA mechanisms. In embodiments, new RA related parameters for EC mode UEs may be initialized. The RA related parameters may be, for example EC level, initial power level, or number of times to repeat a message.

At block 208, the UE 102 may make a determination related to whether criteria are met for the UE to start EC mode, or if a legacy RA procedure may be started. In embodiments, the UE 102 may decide which RA procedure mode may be used by information defined in specification, stored on the UE, and/or indicated to the UE through broadcast or dedicated messages. In examples, new rules, conditions, or criteria may be defined. For example, a rule may be defined that a UE having one or more unsuccessful completions under a legacy RA procedure may attempt to use EC RA procedure.

In other non-limiting examples, threshold values may be used to trigger or determine when a UE should use an EC RA procedure. These threshold values could be defined based on some UE specific parameter, such as measured reference signal received power (RSRP), measured reference signal received quality (RSRQ), preamble transmission counter value or physical random access channel (PRACH) preamble transmission power.

In other non-limiting examples, the determination may be based on the predefined category/capability specific information that is stored at the UE 102. For example, UE Category X may be required to always use EC RA procedures, or alternatively UE Category X may be allowed to use EC RA procedure based on other criteria in addition to its category.

If the criteria are not met to start EC mode, then at block 210 the UE 102 may use the legacy RA procedure. The process 200 may then end at block 234.

Otherwise, if the criteria are met to start EC mode, then at block 212 the UE 102 may use EC mode for the RA procedure and identify the starting EC level. In embodiments, the UE 102 may identify the EC level to use based on a stored value within the UE 102, or by receiving and/or decoding EC level information sent by the eNB 104 in the EC RA preamble assignment 106. The EC level may be important for a variety of reasons. For example, the RA related configuration may need to be updated based on the EC level. The maximum UL transmit power may be chosen directly with any EC level, or RA preambles and/or configurations may be based on the identified EC level. The EC level may also be associated with a specific number of message repetitions that are available to the UE 102 while attempting to communicate with the eNB. As a result, the RA procedure may use, for example, a number of repeated messages, with each subsequent repeat using an increased power level, or power ramp-up, when attempting to establish an RRC connection. Other aspects related to the RA message resource allocation information within the EC RA preamble assignment 106 may include details of frequency hopping, the group of sequences that may be used for the preamble transmission if the UE is in EC mode, and/or if different EC levels are identified by their preamble sequences.

At block 214, the UE 102 may send an RA preamble and corresponding copies of the RA preamble based on the identified EC level. In embodiments, the RA preamble may be repeatedly sent for a number of times based on the identified EC level. In embodiments, the RA preamble group and/or subgroup, RA preamble time resource (PRACH subframes), frequency resources, and the like may depend on the identified EC level, as well as the subframes where the UE 102 sends the multiple copies of the EC RA preamble to allow the network to combine the multiple EC RA preamble copies. In embodiments, there may be a maximum of n preamble copies sent, n depending on the identified EC level. In embodiments, the UE 102 may determine the RA-RNTI based on the identified EC level, RA preamble, and RA preamble time and frequency resource.

At block 216, the UE 102 may begin to receive and/or to combine resources to receive an EC RAR message 110. In embodiments, the resource location of the EC RAR message 110 may be known by the UE after determining release 13 RA-RNTI, through a release 13 enhanced physical downlink control channel (ePDCCH) addressed to a group of UEs that attempt to access with same EC level or EC RA preamble 108, or through a release 13 ePDCCH addressed to specific UE or based on pre-configured/pre-defined information that is pre-defined and/or broadcasted in an SI message. In addition, the EC RAR message 110 could be a release 13 RAR different for that EC level or could be UE specific or a new kind of EC RAR message 110 that may carry the random access response. This process might be done only once, or repeated several times if a release 13 EC RAR-window concept is also defined and/or extended, as described below.

At block 218, the UE 102 may determine whether the EC RAR message 110 addressed to the UE was successfully decoded within a window of time. In embodiments, the window of time may be the EC window value. In embodiments, the window of time may vary based on the EC level, for example it may be proportional to the EC level identified or may be based on the maximum number of preamble repetitions allowed for the EC level.

Figure 2B:
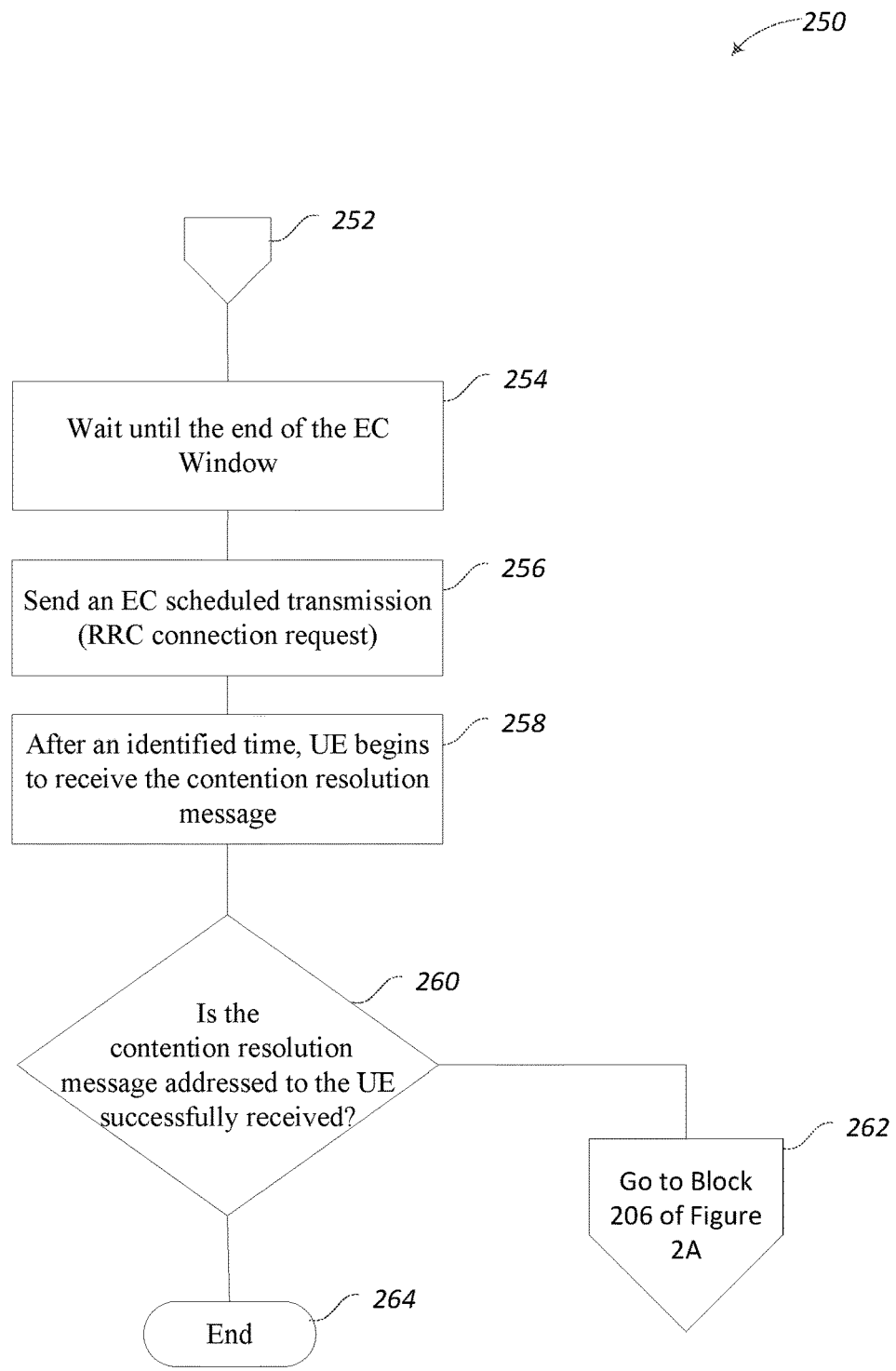
FIG. 2B illustrates a process for contention-based random access procedure performed by a UE using EC functionality, in accordance with various embodiments.

If the EC RAR message 110 was successfully decoded within a window of time, then at block 220 the process goes to block 252 of FIG. 2B.

Otherwise, if the EC RAR message 110 was not successfully decoded within a window of time, then at block 222 the transmission counter may be incremented by one. In embodiments, the EC RAR message 110 may not have been successfully decoded because it may not have been sent by the eNB, or may have been sent but may not have contained the RAPID that the UE included in the EC RA preamble 108.

At block 224, the UE 102 may determine if the transmission counter is equal to the maximum transmission count for the current EC level. If the transmission counter is equal to the maximum transmission count for the current EC level, then at block 230 the UE 102 may determine that the EC RA procedure has unsuccessfully completed. In embodiments, this may occur if the maximum number of attempts is reached for the highest EC level. In embodiments, the UE may inform the RRC upper layers about the RA failure, and the upper layers may initiate the EC RA procedure again at a later time. Based on the previous RA failure, the RA procedure may be initiated by changing the EC level, for example incrementing the EC level, to a level more suitable for when the UE is deeper within the enhanced coverage region of the cell such as deep within a building. At block 232, the process 200 may end.

Otherwise, if the transmission counter is not equal to the maximum transmission count for the current EC level, then at block 226 the UE 102 may wait for the back-off time to expire for the EC level. In embodiments, the UE may try to send the EC RA preamble 108 again. For example, this may be done after applying preamble power ramping if specified or configured for EC. In embodiments, a transmission counter may be used to place a limit on the maximum number of PRACH preamble transmission trials for the current EC level. In embodiments, a transmission counter may determine when the UE may switch to another EC level, for example to a higher EC level which may allow for more message repetitions or a higher power level.

At block 228, the UE 102 may increment the transmission counter by 1, and the process 200 may proceed to block 212.

FIG. 2B illustrates a process 250 for contention-based random access procedure performed by a UE using EC functionality, in accordance with various embodiments. The process 250 may be performed by a UE (e.g., UE 102) for EC mode operation in accordance with various embodiments. In some embodiments, the UE may include one or more non-transitory computer-readable media having instructions, stored thereon, that when executed cause the UE to perform the process 250.

At block 252, the process 250 may continue from block 220 of FIG. 2A.

At block 254, the UE 102 may wait until the end of the EC window. In embodiments, the UE may wait until the end of the EC window before it starts transmitting the EC Scheduled Transmission message 112. In embodiments, for any particular EC level identified, as described for example in block 212, that EC level may have an associated number of repetitions identifying the number of times the EC RAR message 110 has been sent. If the UE is able to decode the EC RAR message 110 earlier than the number of times the EC RAR message 110 has been sent, the UE may wait for the amount of time it may take the last EC RAR message 110 to be received. In embodiments, the UL allocation of the EC scheduled transmission 112 may be scheduled only after the last repetition of the EC RAR message 110 is sent by the eNB.

At block 256, the UE 102 may send a scheduled transmission, for example an RRC connection request, to the eNB.

At block 258 the UE 102 may, after an identified time, begin to receive the contention resolution message.

At block 260, the UE 102 may determine if the contention resolution message addressed to the UE has been successfully received. A process similar to the EC RA procedure, as described above, may be applied or extended if the RA procedure fails in contention resolution phase 114. In embodiments, this may occur if the EC scheduled transmission 112 was not correctly received at the eNB or if the EC scheduled transmission 112 from the given UE collided with another EC scheduled transmission 112 and only the other UE's EC scheduled transmission 112 was detected. For the latter case, the given UE may receive the EC contention resolution message 114 from the eNB but may determine that it was not addressed to that specific UE.

In other embodiments, a concept similar to legacy macContentionResolutionTimer may be applied if EC contention resolution 114 is not received while using EC mode. In these embodiments, the value of this timer may scale or may be updated based on how long the EC repetitions of the scheduled transmission 112 are expected to take. This may occur when the EC scheduled transmission 112 was not correctly received by the eNB or the eNB received and responded but the EC contention resolution 114 was not received successfully at the UE.

If the UE 102 determines that the contention resolution message has been successfully received, then at block 264 the process 250 may end.

If the UE 102 determines that the contention resolution message has not been successfully received, then the process may proceed to block 262 which then may return the process to block 208 of FIG. 2A.

In embodiments, when the EC contention resolution 114 fails, the UE may apply an analogous procedure to resend the RA preamble with incrementing or re-initializing the preamble transmission counter. For the option of re-initialization of the preamble transmission counter, the UE may restart the RA process again as in the case of legacy operation.

In embodiments, if the network conditions may have changed since the previous RA trial, the process may allow the UE to switch to legacy procedure instead of EC procedure, or vice versa. Additionally, the updated network conditions may tell the UE to start from different EC level.

For the embodiments described herein, for simplicity, the use of the contention-based RA procedure for EC mode by a UE in RRC_IDLE may be shown, for example initiating an RRC connection. However, the contention-based RA procedure for EC mode may also be used by a UE in RRC_CONNECTED. In addition, for simplicity, legacy names may be used for the new release 13 EC RA parameters and embodied procedures. However, this should not be restricted to these names, as some of the names may refer to same parameters as used in the legacy RA procedure or may also refer to completely new and different parameters that get defined to fulfil the same functionality explained herein.

For example, in embodiments the UE may select the RA resources differently depending on whether the UE uses the legacy RA procedure or the EC RA procedure. In addition, for the EC RA procedure, different values of the legacy RA parameters or even different or new parameters may be defined for EC mode or for each EC level. For example, back-off time, which may be a parameter involved in the RA procedure, may have one or more different values per EC level or different parameters might be defined for each EC level. In another example, the PREAMBLE_TRANS_MAX value may be updated or a new parameter may be defined to trigger when the legacy RA procedure may pass to the EC RA procedure. Alternatively, power ramping for preamble transmission may not be considered when EC mode is used in RA procedure, as the UE may use maximum transmit power in challenging locations with poor coverage. In embodiments, the new release 13 criteria or conditions may be defined in the specification or may be broadcasted for the UE to know which parameters or values should be used for EC RA procedure or for a specific EC RA level.

Figure 3A:
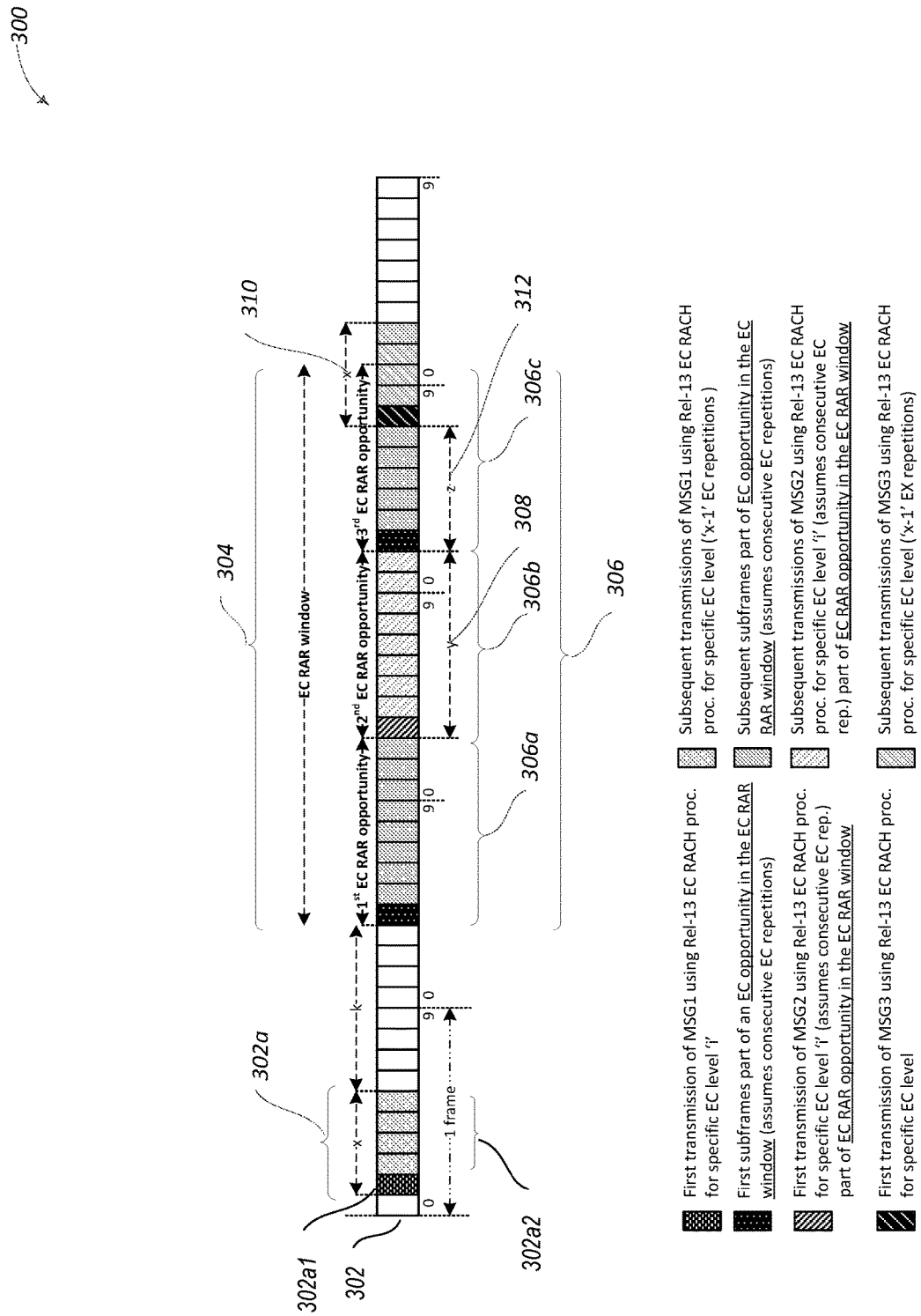
FIGS. 3A, 3B, and 3C are diagrams illustrating frame structures that may be used for implementing random access response (RAR) opportunities within an EC RAR window that may be used by a UE and an eNB, in accordance with various embodiments.
Figure 3B:
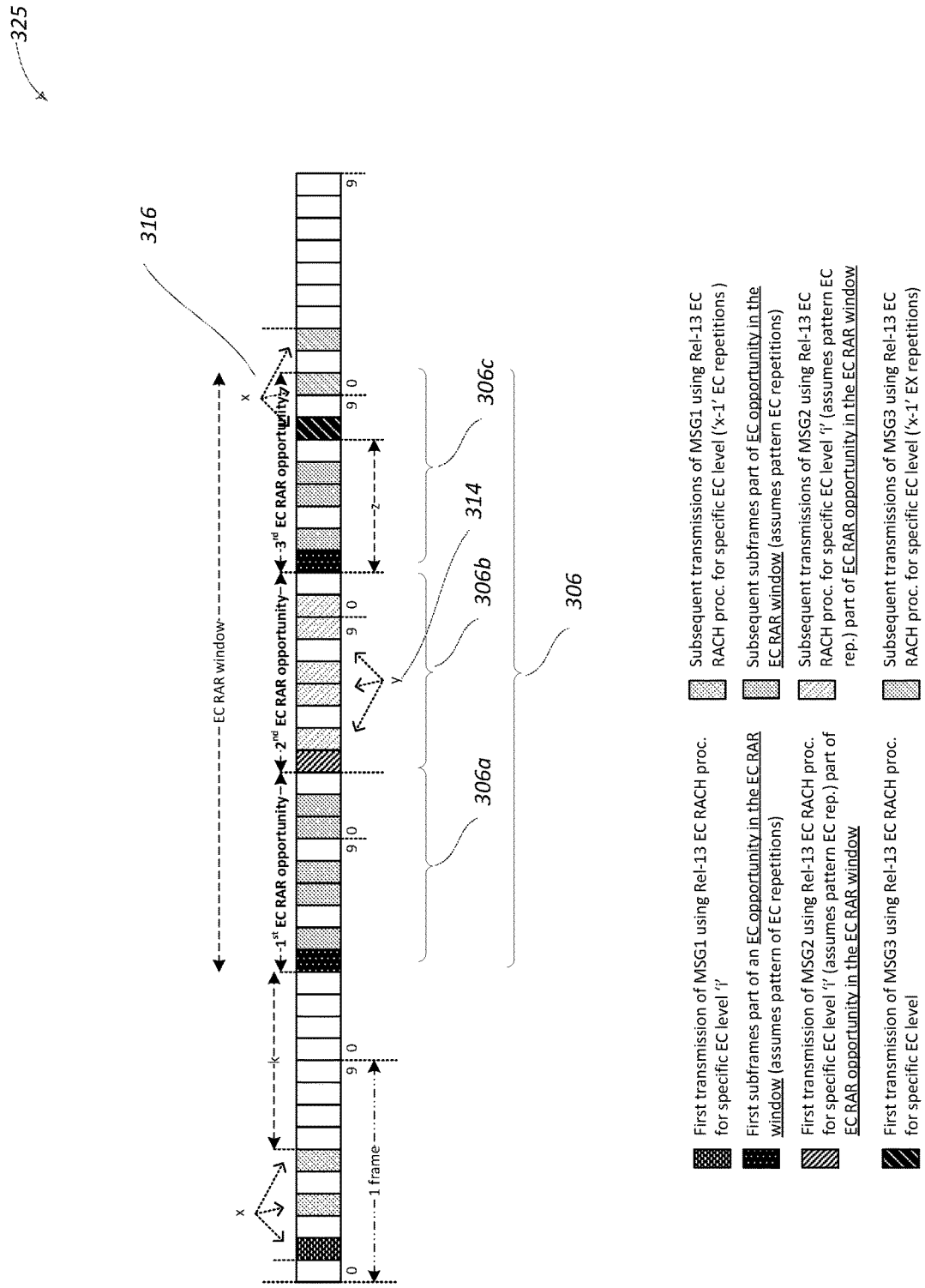
Figure 3C:
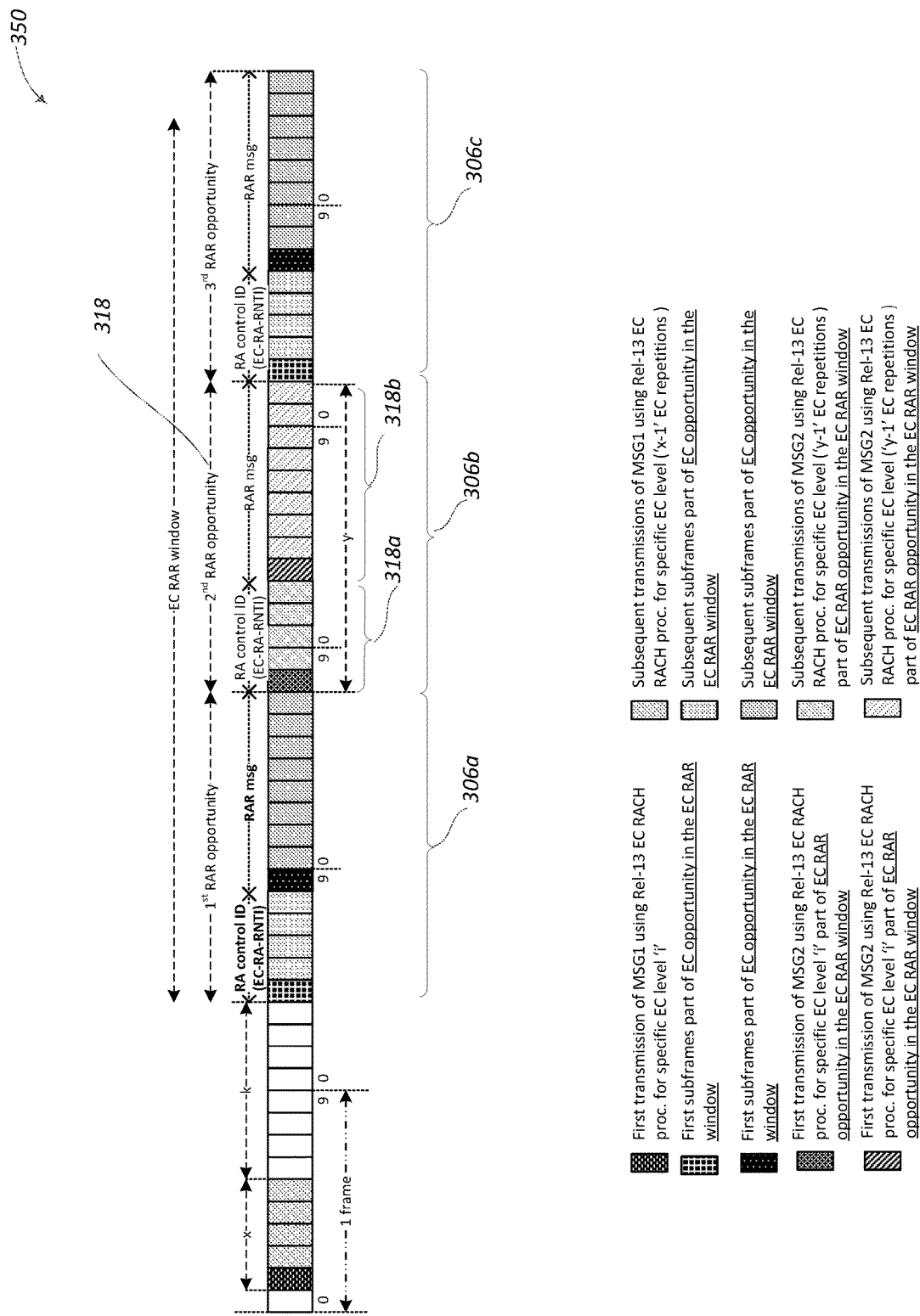

FIGS. 3A, 3B, and 3C are diagrams illustrating example frame structures for implementing RAR opportunities within an EC RAR window that may be used by a UE when receiving an EC RAR, in accordance with various embodiments.

In FIG. 3A, diagram 300 shows one implementation of an EC RAR window 304 within a sequence of frames 302. In embodiments, the EC RAR window 304 may start k subframes after the EC RA preamble transmission 108 is supposed to finish. In embodiments, k may be defined to a value of 3, for example, to accommodate devices operating in accordance with legacy long term evolution (LTE) RA procedures, or it may be a greater value, for example, in order to account for increased processing requirements for the eNB to support a reduced bandwidth UEs and EC mode.

In embodiments, the EC RAR window 304 may contain one or more EC RAR opportunities 306. The number of EC RAR opportunities 306a, 306b, 306c within the EC RAR window 304 may be defined in the specification or may be broadcasted as part of the EC RA Preamble assignment 106. In embodiments, the first EC RAR 306a may start at the same sub-frame as the EC RAR window 304. The length of the EC RAR opportunity 306a may vary. For example, the length may depend on the number of repetitions required for the EC level, or on how many of the subframes in the EC RAR opportunity 306a carry an actual EC RAR message 110. In embodiments, this may be due to the EC RAR message 110 being repeated multiple times due to repeated transmissions permitted by the EC level. Diagram 300 shows an example where all of the subframes in the EC RAR opportunities 306a, 306b, 306c carry an EC RAR message 110.

In embodiments, the first transmission of the EC RA preamble 106 for a specific EC level may occur within multiple RA preamble sub frames 302a. In embodiments, a specific EC RA preamble 302a1 may be sent in specific time and frequencies, (i.e. resources) for the eNB to know that the UE is using a certain EC level. In embodiments, the EC RA preamble may also identify whether this UE is release 13 LC. In embodiments, subsequent transmissions of the EC RA preamble 302a2 may use the EC RACH process for a specific EC level. For example, the subsequent transmissions of the EC RA preamble 302a2 may be in different subframes (not shown).

In embodiments, after one or more transmissions of the EC RA preamble 302a, the UE may wait k subframes before starting the EC RAR window 304.

In embodiments, the RAR opportunities 306 may have the same number of frames as the EC RAR window. In some embodiments, within the EC RAR window 304, there may be a first EC RAR opportunity 306a. UE may combine the EC RAR related resources of each sub-frame within the first EC RAR opportunity 306a so that the EC RAR message 110 may be decoded. In embodiments, the UE may then look for a RA-RNTI and, if the RA-RNTI is found, the UE may then look for the RAR message.

In embodiments, the second EC RAR opportunity 306b of the EC RAR window 306 may be identified. In embodiments, this may be in response to subsequent transmissions of the EC RAR message 110, for example a response to one of the EC RA preamble 108 repetitions, where the number of repetitions may be identified based on EC level.

In embodiments, UE 102 using a certain EC level may require x 310 and y 308 EC total repetitions for the uplink and downlink directions respectively, where x 310 or y 308 may have the same or different values for uplink and downlink. In these embodiments, the EC repetitions are consecutive.

In embodiments, after the EC RAR message 110 has been successfully decoded, for example using data received from the second EC RAR opportunity 306b, the UE may wait z 312 subframes before sending an EC scheduled transmission 112 in the UL in accordance with the allocated grant from the decoded EC RAR message 110. In this example, the other EC RAR opportunity 306c may be ignored because the UE has already successfully decoded the RAR message from the eNB.

In embodiments, EC RAR window 304 may be formed in a number of ways. For example, the EC RAR window 304 may be formed by EC RAR opportunities 306a, 306b, 306c of one specific EC level. In embodiments, UEs that may be checking that EC RAR window would have the same EC level requirement. As a result, the network might have a different EC RAR window 304 region for each EC level, which may have different locations in time, frequency and/or number of EC required repetitions.

In embodiments, EC RAR opportunities 306a, 306b, 306c may differ based on different EC levels. In these embodiments, the network may indicate or the 3GPP LTE specification may define which EC level may correspond to each EC RAR opportunity (not shown). In embodiments, all opportunities of the same EC level may be located consecutively or they may be alternated.

In FIG. 3B diagram 325 shows an example of an EC RAR window where not all subframes in the EC RAR opportunities 306a, 306b, 306c carry an EC RAR message 110. For example, UE 102 may be using an EC level that may require x 316 and y 314 EC total repetitions for each downlink and uplink direction respectively, where x 316 and y 314 may have the same or different values. In this example, EC repetitions are not in consecutive subframes.

In FIG. 3C, diagram 350 shows embodiments where the length of the EC RAR opportunities 306a, 306b, 306c may also vary if, in addition to the EC RAR message 110, an RA control indicator (EC RA-RNTI) is received. For example, in the second EC RAR opportunity window 318, the RA control identifier 318a is prepended to the RAR message 318b. In this example 350, the EC repetitions are consecutive. In embodiments the RA control identifier 318a area may be used for other RAR messaging.

The additional message added to the RAR opportunity window may be due to repetitions of the Physical Downlink Control Channel (PDCCH) for MTC that may be based on release 13 enhanced physical downlink control channel (ePDCCH). The downlink control information (DCI) carried by this PDCCH, with its cyclic redundancy check CRC scrambled with the EC RA-RNTI, may schedule the transmission of the RAR message using cross-sub-frame scheduling.

In embodiments (not shown), some EC RA parameters, such as EC RA preamble, EC RAR window, and EC RAR opportunity, may be defined differently depending on the EC level, for example 5 decibels (dB) EC vs 10 dB EC. Examples may include different starting times, different allocation of frequency resources, or number of EC repetitions required.

Additionally, in embodiments, the number of EC repetitions for each RA message sent between the UE and eNB in EC mode may be the same or may differ for each message.

In embodiments, the number of repetitions may differ, based on the number of repetitions of one or more of the previous messages sent between the UE and eNB in EC mode. For example, the number of repetitions for the EC RAR message 110 may be a function of the number of repetitions for EC RA preamble 108, with an adjustment based on the difference between the downlink and uplink timing. In another example, the number of repetitions for the EC scheduled transmission 112 may be indicated in the EC RAR message 110 or may be otherwise specified.

Figure 4:
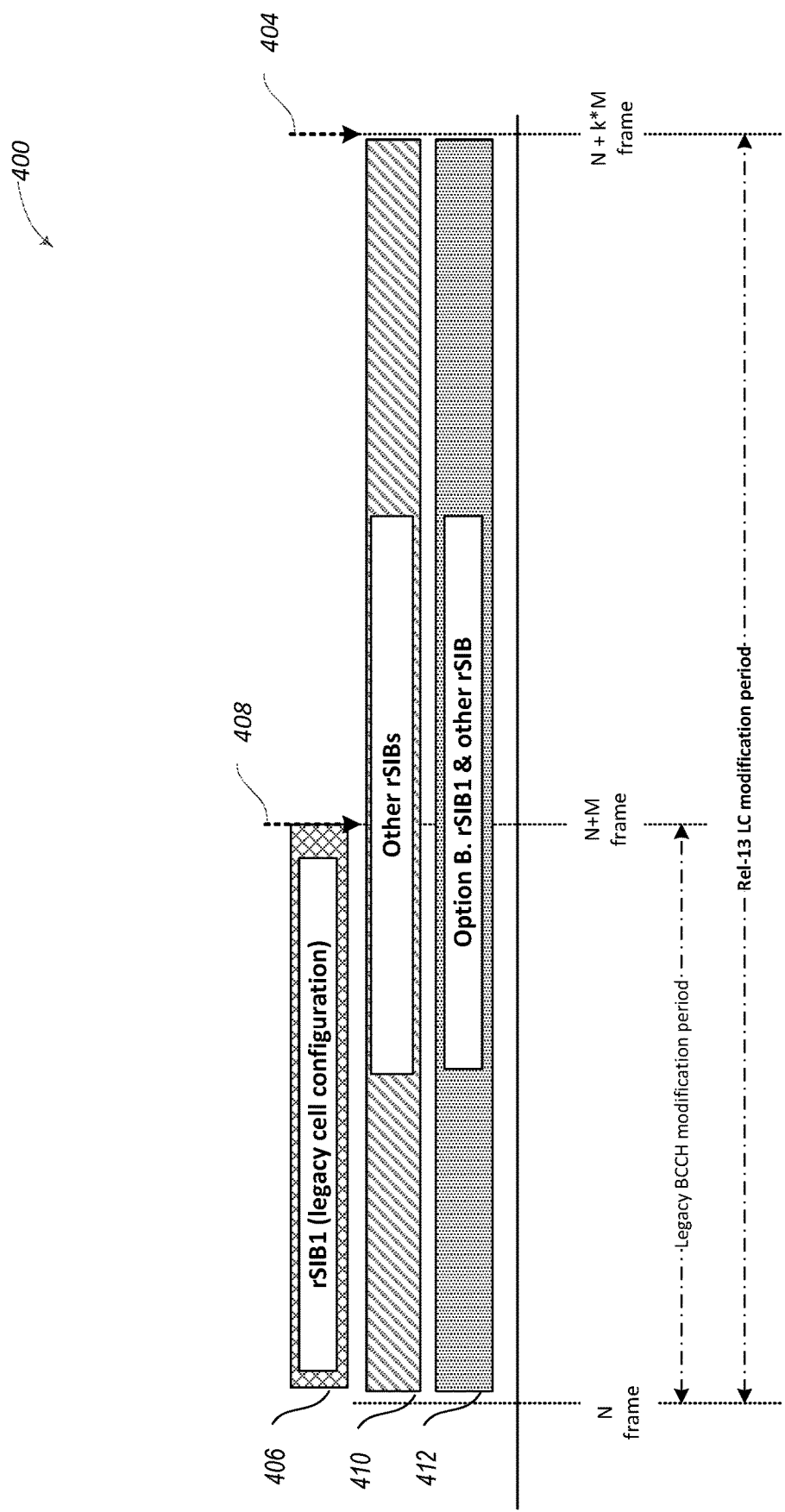
FIG. 4 is a diagram illustrating frame structures for implementing a different modification period for the system information (SI) addressed to a UE in EC mode, in accordance with various embodiments.

FIG. 4 is a diagram illustrating frame structures for implementing a different modification period for the SI addressed to a UE in EC mode, in accordance with various embodiments.

Diagram 400 shows, in embodiments, an rSIB1 which may be used for release 13 low complexity and delay tolerant UEs, such as release 13 LC UE and release 13 UEs capable of using EC mode. For this rSIB1 that contains cell specific configuration information may be changed same as for legacy SIBs at instances other than that of the N+k*M frame 404. In embodiments, implementing an rSIB1 may have the advantage of lessening the impact and restrictions on legacy network behavior.

In embodiments, a first rSIB, rSIB1 406, may have the same modification period as legacy SIBs and the rSIB1 406 also may be updated at the N+M frame 408. In embodiments, other rSIBs 410 which do not contain cell specific configuration information may be changed less frequently, for example less often with longer modification periods. In embodiments, rSIB1 406 and other SIBs 412 may have the same modification period and may be updated at the end of the N+k*M frame 404.

Figure 5:
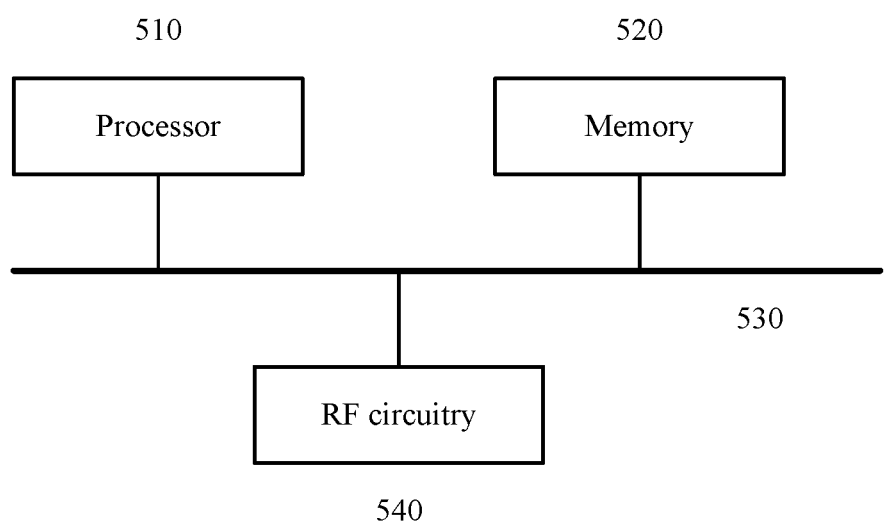
FIG. 5 is a block diagram illustrating a computing device adapted to operate in a wireless communication network in EC mode, in accordance with various embodiments.

FIG. 5 illustrates a simplified block diagram of UE 102 of FIG. 1 in accordance with various embodiments of the disclosure. As shown in FIG. 5, UE 102 includes a processor 510, radio frequency (RF) circuitry 540 and a memory 520. The processor 510 may include one or more single-core or multi-core processors, and may include any combination of general-purpose processors and dedicated processors (e.g. graphics processors, application processors, baseband processors, etc.). In accordance with various embodiments, the processor 510 (and in particular, a baseband chipset of the processor 510) may include configuration logic. The configuration logic may be operable to identify an initial EC level that is to be used during a contention-based RA procedure, the EC level having at least an associated power level, window of time, and number of send attempts. The configuration logic may be operable to send a first message to a radio access network (RAN) based on the identified EC level. The configuration logic may be operable to determine whether a second message from the RAN in response to the first message is received within the window of time. The configuration logic may be operable to, if the second message is received from the eNB within the window of time, decode the received second message. The configuration logic may be operable to, if the second message is not received from the eNB within the window of time, re-send the first message to the RAN and track a number of times the first message has been sent using a transmission counter having a numerical value; and output an indication that the EC RA procedure did not complete successfully based on determination of a whether the second message is received within a window of time and a comparison of the transmission counter to a transmission threshold value.

The RF circuitry 540 may be coupled to the processor 510, for example via a bus 530, and may be used to transmit or receive data.

The memory 520 may include one or more non-transitory, computer-readable media having instructions stored thereon, and the instructions when executed by the processor 510 may cause UE 102 to perform the operations described above in connection with the processor 510. However, this is only illustrative rather than limiting; those of ordinary skill in the art will appreciate alternative implementations in software, hardware, firmware, or any combination thereof.

Figure 6:
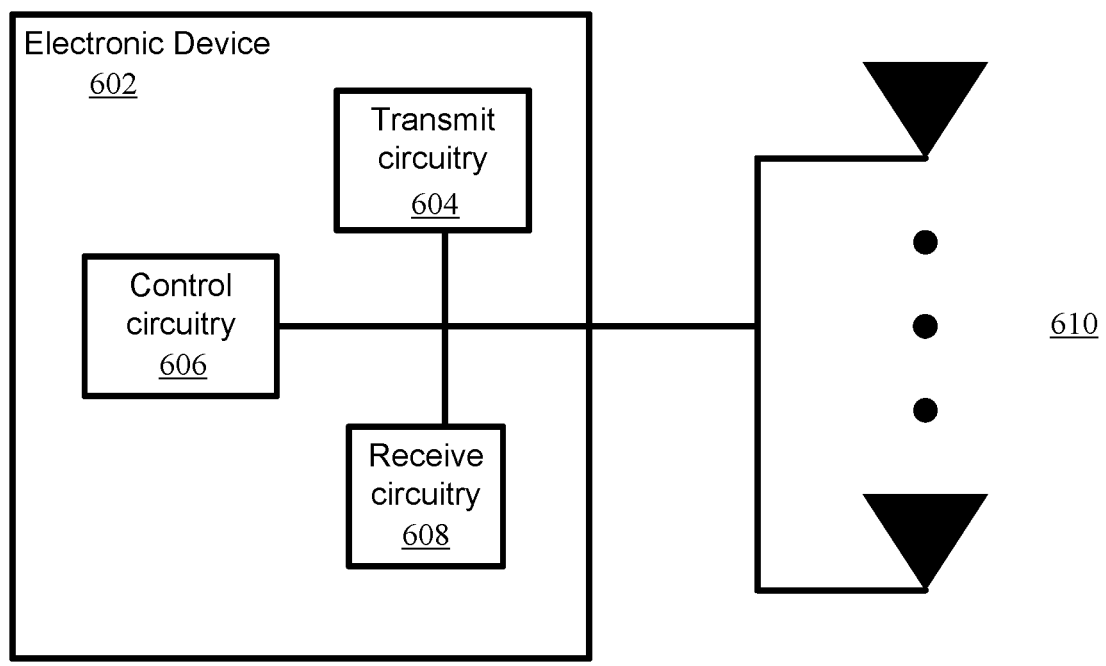
FIG. 6 illustrates electronic device circuitry that may be eNB circuitry, UE circuitry, or some other type of circuitry in accordance with various embodiments.

FIG. 6 illustrates electronic device circuitry 602 that may be eNB circuitry, UE circuitry, or some other type of circuitry in accordance with various embodiments. In embodiments, the electronic device circuitry 602 may be, or may be incorporated into or otherwise a part of, an eNB, a UE, or some other type of electronic device. In embodiments, the electronic device circuitry 602 may include radio transmit circuitry and receive circuitry coupled to control circuitry 606. In embodiments, the transmit 604 and/or receive circuitry 608 may be elements or modules of transceiver circuitry, as shown. The electronic device circuitry 602 may be coupled with one or more plurality of antenna elements of one or more antennas 610. The electronic device circuitry and/or the components of the electronic device circuitry may be configured to perform operations similar to those described elsewhere in this disclosure.

In embodiments where the electronic device circuitry 602 is a UE or is part of or otherwise incorporated into a UE, the UE may be capable of operation in accordance with EC mode. The control circuitry 606 may be to identify the EC mode. The control circuitry 606 may be further to operate in accordance with the EC mode. The transmit 604 and/or receive circuitry 608 may be to send and/or receive one or more signals or transmissions in accordance with the EC mode.

In embodiments where the electronic device circuitry 602 is an eNB or is part of or otherwise incorporated into an eNB the electronic device may be capable of operation of different modification periods for transmission and update of SI. The control circuitry 606 may be to identify a modification period from a plurality of modification periods. The transmit circuitry 604 may be to transmit a transmission and/or update of SI in accordance with the identified modification period.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry 602 may be implemented in, or functions associated with the circuitry may be implemented by, one or more software or firmware modules.

Figure 7:
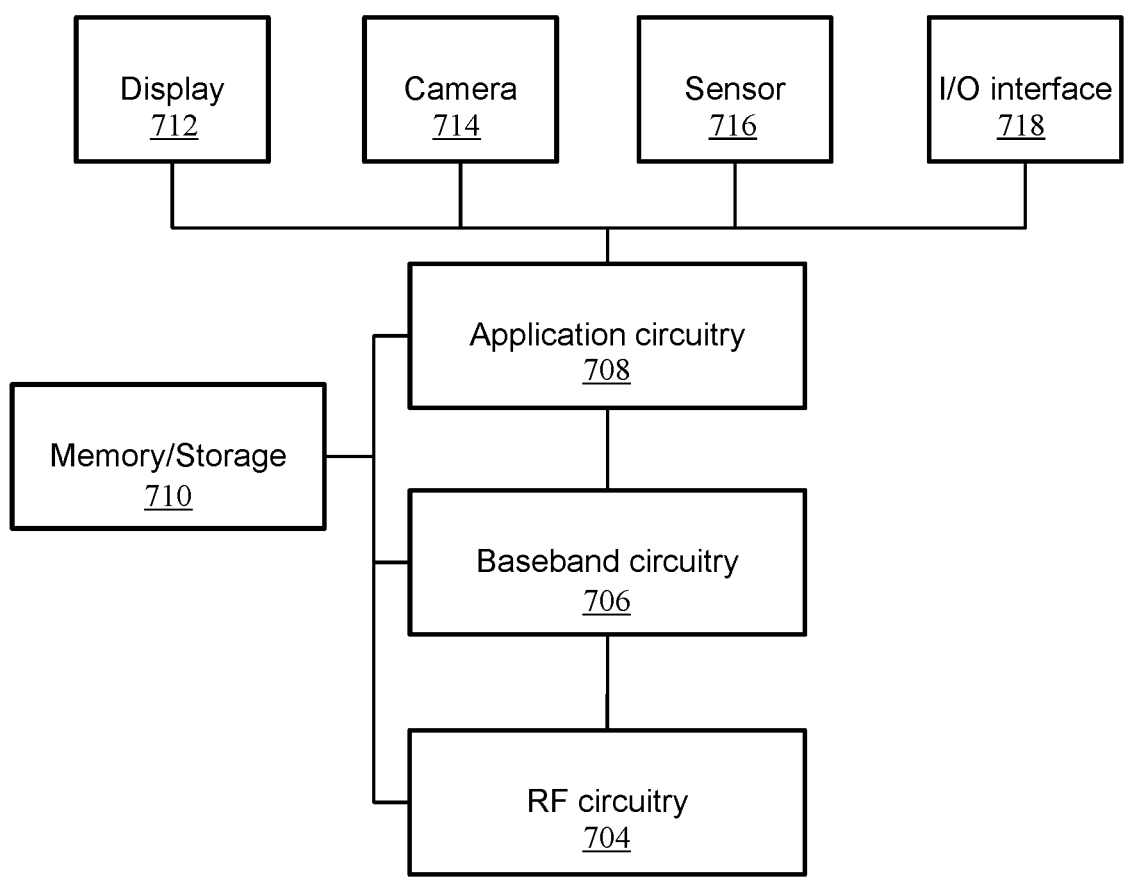
FIG. 7 illustrates, for one embodiment, an example system comprising radio frequency (RF) circuitry, baseband circuitry, application circuitry, memory/storage, display, camera, sensor, and input/output (I/O) interface, coupled with each other at least as shown.

Embodiments described herein may be implemented into a system using any suitably configured hardware and/or software. FIG. 7 illustrates, for one embodiment, an example system 702 comprising RF circuitry 704, baseband circuitry 706, application circuitry 708, memory/storage 710, display 712, camera 714, sensor 716, and input/output (I/O) interface 718, coupled with each other at least as shown.

The application circuitry 708 may include circuitry such as, but not limited to, one or more single-core or multi-core processors. The processor(s) may include any combination of general-purpose processors and dedicated processors (e.g., graphics processors, application processors, etc.). The processors may be coupled with memory/storage and configured to execute instructions stored in the memory/storage to enable various applications and/or operating systems running on the system.

The baseband circuitry 706 may include circuitry such as, but not limited to, one or more single-core or multi-core processors. The processor(s) may include a baseband processor. The baseband circuitry 706 may handle various radio control functions that enables communication with one or more radio networks via the RF circuitry. The radio control functions may include, but are not limited to, signal modulation, encoding, decoding, radio frequency shifting, etc. In some embodiments, the baseband circuitry 706 may provide for communication compatible with one or more radio technologies. For example, in some embodiments, the baseband circuitry 706 may support communication with an evolved universal terrestrial radio access network (EU-TRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, baseband circuitry 706 may include circuitry to operate with signals that are not strictly considered as being in a baseband frequency. For example, in some embodiments, baseband circuitry 706 may include circuitry to operate with signals having an intermediate frequency, which is between a baseband frequency and a radio frequency.

RF circuitry 704 may enable communication with wireless networks using modulated electromagnetic radiation through a non-solid medium. In various embodiments, the RF circuitry 704 may include switches, filters, amplifiers, etc. to facilitate the communication with the wireless network.

In various embodiments, RF circuitry 704 may include circuitry to operate with signals that are not strictly considered as being in a radio frequency. For example, in some embodiments, RF circuitry 704 may include circuitry to operate with signals having an intermediate frequency, which is between a baseband frequency and a radio frequency.

In various embodiments, transmit circuitry 604, control circuitry 606, and/or receive circuitry 608 discussed or described herein may be embodied in whole or in part in one or more of the RF circuitry, the baseband circuitry, and/or the application circuitry. As used herein, the term "circuitry" may refer to, be part of, or include an ASIC, an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

Memory/storage 710 may be used to load and store data and/or instructions, for example, for system. Memory/storage 710 for one embodiment may include any combination of suitable volatile memory (e.g., dynamic random access memory (DRAM)) and/or non-volatile memory (e.g., Flash memory).

In various embodiments, the I/O interface 718 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 716 may include one or more sensing devices to determine environmental conditions and/or location information related to the system. In some embodiments, the sensors 716 may include, but are not limited to, a gyro sensor, an accelerometer, a proximity sensor, an ambient light sensor, and a positioning unit. The positioning unit may also be part of, or interact with, the baseband circuitry 706a and/or RF circuitry 704 to communicate with components of a positioning network, e.g., a global positioning system (GPS) satellite.

In various embodiments, the display 712 may include a liquid crystal display, a touch screen display, and the like.

In various embodiments, the system 702 may be a mobile computing device such as, but not limited to, a laptop computing device, a tablet computing device, a netbook, an ultrabook, a smartphone, etc. In various embodiments, system may have more or less components, and/or different architectures.

In various embodiments, the system 702 may be a mobile computing device such as, but not limited to, a laptop computing device, a tablet computing device, a netbook, an ultrabook, a smartphone, etc. In various embodiments, system may have more or less components, and/or different architectures. For example, in some embodiments the RF circuitry 704 and/or the baseband circuitry 706 may be embodied in communication circuitry (not shown). The communication circuitry may include circuitry such as, but not limited to, one or more single-core or multi-core processors and logic circuits to provide signal processing techniques, for example, encoding, modulation, filtering, converting, amplifying, etc., suitable to the appropriate communication interface over which communications will take place. The communication circuitry may communicate over wireline, optical, or wireless communication mediums. In embodiments in which the system is configured for wireless communication, the communication circuitry may include the RF circuitry and/or baseband circuitry to provide for communication compatible with one or more radio technologies. For example, in some embodiments, the communication circuitry may support communication with an evolved universal terrestrial radio access network (EU-TRAN) and/or other wireless metropolitan area networks (WMAN), a wireless local area network (WLAN), a wireless personal area network (WPAN).

Embodiments of the technology herein may be described as related to the 3GPP long term evolution (LTE) or LTE-advanced (LTE-A) standards. For example, terms or entities such as eNB, mobility management entity (MME), UE, etc. may be used that may be viewed as LTE-related terms or entities. However, in other embodiments the technology may be used in or related to other wireless technologies such as the Institute of Electrical and Electronic Engineers (IEEE) 802.16 wireless technology (WiMax), IEEE 802.11 wireless technology (WiFi), various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed. In those embodiments, where LTE-related terms such as eNB, MME, UE, etc. are used, one or more entities or components may be used that may be considered to be equivalent or approximately equivalent to one or more of the LTE-based terms or entities.

Some non-limiting examples may include the following:

Example 1 may include a user equipment (UE) capable of operation in accordance with enhanced coverage (EC) mode, the UE comprising: control circuitry to: identify the EC mode; and operate in accordance with the EC mode; and transmit and/or receive circuitry coupled with the control circuitry, the transmit and/or receive circuitry to send and/or receive one or more signals or transmissions in accordance with the EC mode.

Example 2 may include the subject matter of Example 1 or some other example herein, wherein the control circuitry, transmit circuitry, and/or receive circuitry are further to transmit, receive, and/or combine multiple repetitions of a message to enhance its coverage.

Example 3 may include the subject matter of Example 1 or some other example herein, wherein the UE is to operate on normal system bandwidth (BW) as well as reduced BW within the whole system BW.

Example 4 may include the subject matter of Example 1 or some other example herein, wherein the UE is to operate with delay tolerant machine type communications (MTC).

Example 5 may include the subject matter of Example 1 or some other example herein, wherein the UE may trigger the usage of one or more different EC levels based on a desired coverage enhancement.

Example 6 may include the subject matter of Example 1 or some other example herein, wherein the UE may use EC mode for a random access (RA) procedure.

Example 7 may include the subject matter of Example 6 or some other example herein, wherein the UE may use EC mode for contention-based RA procedure.

Example 8 may include the subject matter of Example 6 or some other example herein, wherein the trigger events to use EC mode for RA procedure may be related to or based on a desired EC level.

Example 9 may include the subject matter of Example 6 or some other example herein, wherein the trigger to use EC mode for RA procedure may be based on or related to a failure of a normal (legacy) RA procedure.

Example 10 may include the subject matter of Example 6 or some other example herein, wherein the trigger to use EC mode for RA procedure may be related to or based on reaching a certain threshold, criteria or condition such as, maximum number of preamble transmissions, maximum preamble transmission power or thresholds for measured reference signal power/quality (RSRP/RSRQ).

Example 11 may include the subject matter of Example 6 or some other example herein, wherein the UE may use different RA configuration information depending on the EC level.

Example 12 may include the subject matter of Example 6 or some other example herein, wherein the control circuitry may trigger the usage of EC mode due to failure of the reception of RA message 2 (RAR).

Example 13 may include the subject matter of Example 6 or some other example herein, wherein the UE may trigger the usage of EC mode due to failure of the reception of RA message 4 (such as, RRC Connection Setup).

Example 14 may include the subject matter of Example 6 or some other example herein, wherein the UE may use enhanced coverage random access response (EC RAR) window to monitor the RA message 2 (RAR) sent in response to RA message 1 (RA preamble).

Example 15 may include the subject matter of Example 14 or some other example herein, wherein EC RAR opportunities may be defined within the EC RAR window.

Example 16 may include the subject matter of Example 14 or some other example herein, wherein the repetitions of the RA message 2 may be scheduled with a known pattern i.e. predefined or preconfigured within the EC RAR opportunities.

Example 17 may include the subject matter of Example 14 or some other example herein, wherein repetitions of the RA message 2 may not be included in all subframes within the EC RAR opportunities.

Example 18 may include the subject matter of Example 14 or some other example herein, wherein within the EC RAR opportunities control information carrying the EC RA control identifier (i.e. EC RA radio network temporary identifier (RNTI)) as well as the EC RA message 2 (RAR) is transmitted.

Example 19 may include the subject matter of Example 18 or some other example herein, wherein the UE may not need to receive EC RA message 2 if no control information is received that includes the EC RA RNTI that is addressed to the UE.

Example 20 may include an evolved NodeB (eNB) capable of operation of different modification periods for transmission and update of system information (SI), the eNB comprising: control circuitry to identify a modification period from a plurality of modification periods; and transmit circuitry to transmit a transmission and/or update of SI in accordance with the identified modification period.

Example 21 may include the subject matter of Example 20 or some other example herein, wherein the eNB may be capable to operate a cell in normal mode and in EC mode.

Example 22 may include the subject matter of Example 20 or some other example herein, wherein the eNB may define different modification periods for transmission and update of system information specific to normal mode and EC mode.

Example 23 may include the subject matter of Example 20 or some other example herein, wherein the eNB may define the modification periods for SI parameters specific to the cell configuration with same value as normal (legacy) UEs.

Example 24 may include a method comprising determining by the UE of Examples 1-19, or of some other example herein, to choose between the legacy RA proc. and EC RA proc. based on certain thresholds, criteria, configurations and/or requirements.

Example 25 may include the subject matter of Example 24 or some other example herein, wherein the thresholds, criteria, configurations and/or requirements are either preconfigured in the UE or signaled to the UE by the network using unicast and/or broadcast messages.

Example 26 may include the subject matter of Example 24, or of some other example herein, comprising repetition of RA message 1 (preamble) to support UEs requiring EC.

Example 27 may include the subject matter of Example 26 or some other example herein, further comprising of corresponding repetitions of the subsequent RA responses and messages to support the UEs requiring EC.

Example 28 may include a method for the eNB in Examples 20-23 or some other example herein, notifying the UEs of Examples 1-19 of the certain thresholds, criteria, configurations and/or requirements for the EC UEs using dedicated, unicast or broadcast messaging.

Example 29 may include an apparatus comprising means to perform one or more elements of a method described in or related to any of examples 24-28, or any other example, method or process described herein.

Example 30 may include one or more non-transitory computer-readable media comprising instructions to cause an electronic device, upon execution of the instructions by one or more processors of the electronic device, to perform one or more elements of a method described in or related to any of examples 24-28, or any other example, method or process described herein.

Example 31 may include an apparatus comprising control circuitry, transmit circuitry, and/or receive circuitry to perform one or more elements of a method described in or related to any of examples 24-28, or any other example, method or process described herein.

Example 32 may include a method of communicating in a wireless network as shown and described herein.

Example 33 may include a system for providing wireless communication as shown and described herein.

Example 34 may include a device for providing wireless communication as shown and described herein.

Example 35 is an apparatus to be employed in a user equipment, UE, the apparatus comprising: one or more processors; a memory coupled to the one or more processors having instructions thereon that when executed cause the processors to: identify an initial enhanced coverage, EC, level that is to be used in a radio cell during a contention-based random access, RA, procedure, the EC level having at least an associated power level, window of time, and number of send attempts; send a first message to a radio access network, RAN, based on the identified EC level; determine whether a second message from the RAN in response to the first message is received within the window of time; if the second message is received from the eNB within the window of time, decode the received second message; and if the second message is not received from the eNB within the window of time: re-send the first message to the RAN.

Example 36 may include the subject matter of Example 35 or some other example herein, wherein the RAN includes at least one enhanced NodeB, eNB.

Example 37 may include the subject matter of Example 35 or some other example herein, wherein re-send the first message to the RAN further comprises: track a number of times the first message has been sent using a transmission counter having a numerical value; and output an indication that the RA EC procedure did not complete successfully based on determination of a whether the second message is received within a window of time and a comparison of the transmission counter to a transmission threshold value.

Example 38 may include the subject matter of Example 35 or some other example herein, wherein the first message is a random access, RA, preamble and the second message is a random access response, RAR.

Example 39 may include the subject matter of Example 35 or some other example herein, wherein an initial EC level is configured in the UE or is received in a system information block, SIB.

Example 40 may include the subject matter of Example 39 or some other example herein, wherein the SIB is received in a higher bandwidth or in a reduced bandwidth.

Example 41 may include the subject matter of Example 35 or some other example herein, wherein the power level at which the first message is sent is based on one or more of: the value of the transmission counter, or the value of the EC level.

Example 42 may include the subject matter of Example 35 or some other example herein, wherein re-send the first message further includes power ramping.

Example 43 may include the subject matter of Example 42 or some other example herein, wherein the power ramping includes increasing the power to a maximum power level associated with the EC level.

Example 44 may include the subject matter of Example 35 or some other example herein, wherein the window of time is dependent at least on a number of EC RAR opportunities defined within an EC RAR window and/or the number of send attempts for the EC level.

Example 45 may include the subject matter of Example 35 or some other example herein, wherein re-send the first message to the RAN further comprises: include a delay time before re-sending the first message, the delay being one of a function of at least the EC level.

Example 46 may include the subject matter of any one of Examples 35-45 or some other example herein, wherein the UE may be capable to operate in a normal coverage mode and in EC mode.

Example 47 is an apparatus to be employed in an evolved NodeB, eNB, the apparatus comprising: one or more processors; a memory coupled to the one or more processors having instructions thereon that when executed cause the processors to: determine enhanced coverage, EC, levels to be used in a radio cell during a contention-based random access, RA, procedure, send, in a system information block, SIB, to a user equipment, UE, located in the radio cell, an indication of the determined EC levels; receive an RA preamble from a UE, responsive to the RA preamble, transmit a random access response, RAR, message.

Example 48 may include the subject matter of Example 47 or some other example herein, wherein send in a SIB an indication of the determined EC levels further includes send in a reduced bandwidth of 1.4 megahertz or 200 kilohertz.

Example 49 may include the subject matter of Example 47 or some other example herein, wherein the eNB may be to operate a radio cell in normal coverage mode and in EC mode.

Example 50 is an apparatus to be employed in a user equipment, UE, the apparatus comprising: logic circuitry to identify an enhanced coverage, EC level; transmit circuitry to send to a radio access network, RAN, a random access, RA, preamble based on the identified EC level; logic circuitry to identify an EC random access response, RAR, window region having a plurality of subframes.

Example 51 may include the subject matter of Example 50 or some other example herein, further comprising: logic circuitry to identify an EC random access response, RAR, window region having a plurality of subframes, the EC RAR window region including one or more EC RAR opportunities, each being a contiguous group of subframes, the first EC RAR opportunity beginning at the same sub-frame as the beginning of the RAR window region and beginning K subframes after the RA preamble was sent.

Example 52 may include the subject matter of Example 51 or some other example herein, further comprising receive circuitry to: receive, from the RAN, a candidate RAR in the first EC RAR opportunity; until a candidate RAR is able to be decoded, receive, from the RAN, a candidate RAR from an EC RAR opportunity; and if a candidate RAR is able to be decoded, send, to the RAN, an RRC connection request.

Example 53 may include the subject matter of Example 50 or some other example herein, wherein the EC RAR window region is dependent on a value: defined in the specification, broadcast as a part of the SI message, associated with the EC level, or associated with the number of the subframes in EC RAR opportunities that contain an RAR message.

Example 54 is an evolved NodeB, eNB, comprising: control circuitry to identify a system information, SI, modification period associated with a radio cell configuration from a plurality of SI modification periods when in reduced bandwidth mode; and transmit circuitry coupled with the control circuitry, the transmit circuitry to transmit an SI message in accordance with the identified modification period.

Example 55 may include the subject matter of Example 54 or some other example herein, wherein the control circuitry and transmit circuitry are to operate in normal coverage mode and/or in EC mode.

Example 56 may include the subject matter of Example 54 or some other example herein, wherein the control circuitry further defines the modification periods for SI parameters associated with the radio cell configuration with a same value as a normal coverage user equipment, UE.

Example 57 is one or more non-transitory computer-readable media comprising instructions that cause a user equipment, UE, in response to execution of the instructions by the computing device, to: identify an initial enhanced coverage, EC, level that is to be used in a radio cell during a contention-based random access, RA, procedure, the EC level having at least an associated power level, window of time, and number of send attempts; send a first message to a radio access network, RAN, based on the identified EC level; determine whether a second message from the RAN in response to the first message is received within the window of time; if the second message is received from the eNB within the window of time, decode the received second message; and if the second message is not received from the eNB within the window of time, re-send the first message to the RAN.

Example 58 may include the subject matter of Example 57 or some other example herein, wherein the RAN includes at least one enhanced NodeB, eNB.

Example 59 may include the subject matter or Example 57 or some other example herein, wherein re-send the first message to the RAN further comprises: track a number of times the first message has been sent using a transmission counter having a numerical value; and output an indication that the RA EC procedure did not complete successfully based on determination of whether the second message is received within a window of time and a comparison of the transmission counter to a transmission threshold value.

Example 60 may include the subject matter of Example 57 or some other example herein, wherein the first message is a random access, RA, preamble and the second message is a random access response, RAR.

Example 61 may include the subject matter of Example 57 or some other example herein, wherein an initial EC level is configured in the UE or is received in a system information block, SIB.

Example 62 may include the subject matter of Example 61 or some other example herein, wherein the SIB is received in a higher bandwidth or in a reduced bandwidth.

Example 63 may include the subject matter of Example 57 or some other example herein, wherein the power level at which the first message is sent is based on one or more of: the value of the transmission counter, or the value of the EC level.

Example 64 may include the subject matter of Example 57 or some other example herein, wherein re-send the first message further includes power ramping.

Example 65 may include the subject matter of Example 64 or some other example herein, wherein the power ramping includes increasing the power to a maximum power level associated with the EC level.

Example 66 may include the subject matter of Example 57 or some other example herein, wherein the window of time is dependent at least on a number of EC RAR opportunities defined within an EC RAR window and/or the number of send attempts for the EC level.

Example 67 may include the subject matter of Example 57 or some other example herein, wherein re-send the first message to the RAN further comprises: include a delay time before re-sending the first message, the delay being one of a function of at least the EC level.

Example 68 may include the subject matter of any one of Examples 57-67 or some other example herein, wherein the UE may be capable to operate in a normal coverage mode and in EC mode.

Example 69 is one or more non-transitory computer-readable media comprising instructions that cause an enhanced enodeB, eNB, in response to execution of the instructions by the computing device, to: determine enhanced coverage, EC, levels to be used in a radio cell during a contention-based random access, RA, procedure, send, in a system information block, SIB, to a user equipment, UE, located in the radio cell, an indication of the determined EC levels; receive an RA preamble from a UE, responsive to the RA preamble, transmit a random access response, RAR.

Example 70 may include the subject matter of Example 69 or some other example herein, wherein send in a SIB an indication of the determined EC levels further includes send in a higher bandwidth or in a reduced bandwidth.

Example 71 may include the subject matter of Example 69 or some other example herein, wherein the eNB may be to operate a radio cell in normal coverage mode and in EC mode.

Some portions of the preceding detailed description have been presented in terms of algorithms and symbolic representations of operations on data bits within a computer memory. These algorithmic descriptions and representations are the ways used by those skilled in the data processing arts to most effectively convey the substance of their work to others skilled in the arts. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the disclosure also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine- (e.g., a computer-) readable storage medium (e.g., read only memory (ROM), random access memory (RAM), magnetic disk storage media, optical storage media, flash memory devices).

The processes or methods depicted in the preceding figures can be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described can be performed in a different order. Moreover, some operations can be performed in parallel rather than sequentially.

Embodiments of the present disclosure are not described with reference to any particular programming language. It will be appreciated that a variety of programming languages can be used to implement the teachings of embodiments of the disclosure as described herein. In the foregoing Specification, embodiments of the disclosure have been described with reference to specific exemplary embodiments thereof. It will be evident that various modifications can be made thereto without departing from the broader spirit and scope of the disclosure as set forth in the following claims. The Specification and drawings are, accordingly, to be regarded in an illustrative sense rather than a restrictive sense.

The invention claimed is:

1. One or more non-transitory, computer-readable media having instructions that, when executed by one or more processors, cause a user equipment ("UE") to:
    determine an enhanced coverage ("EC") level to be used to transmit a first random access ("RA") message, wherein the first RA message is an RA preamble;
    determine, based at least on the EC level, an initial power at which to transmit the first RA message;
    determine, based at least on the EC level, a repetition level of a second RA message that is to be transmitted in response to the first RA message, wherein the second RA message is an RA response;
    determine a window region associated with the repetition level, wherein the window region has a plurality of subframes including one or more RA message opportunities, and wherein an RA message opportunity begins at a same subframe as a beginning of the window region and k subframes after the first RA message is sent and
    monitor a physical downlink control channel within the plurality of subframes of the window region to decode the second RA message based at least on the repetition level.

2. The one or more non-transitory, computer-readable media of claim 1, wherein the instructions, when executed, further cause the UE to:
    determine configuration of RA resources for each of a plurality of EC levels.

3. The one or more non-transitory, computer-readable media of claim 2, wherein to determine configuration of RA resources, the UE is to:
    determine a number of repetitions for transmitting the RA preamble for each of the plurality of EC levels.

4. The one or more non-transitory, computer-readable media of claim 2, wherein to determine configuration of RA resources, the UE is to:
    determine a frequency hopping configuration for each of the plurality of EC levels.

5. The one or more non-transitory, computer-readable media of claim 2, wherein the instructions, when executed, further cause the UE to:
    process system information to determine the configuration of the RA resources for each of a plurality of EC levels.

6. The one or more non-transitory, computer-readable media of claim 1, wherein the instructions, when executed, further cause the UE to:
    determine an RA-Radio Network Temporary Identifier (RNTI) based on RA preamble time and frequency resources associated with the EC level.

7. The one or more non-transitory, computer-readable media of claim 1, wherein the EC level is a first EC level and the instructions, when executed, further cause the UE to:
    determine the RA response is not received within the window; and
    switch to a second EC level for retransmission of the RA preamble based on said determination the RA response is not received within the window.

8. The one or more non-transitory, computer-readable media of claim 1, wherein the instructions, when executed, further cause the UE to:
    determine the RA response is not received within the window;
    determine a number of transmission attempts is less than a maximum number of preamble transmission attempts allowed for the EC level; and
    cause the RA preamble to be retransmitted with the EC level.

9. One or more non-transitory, computer-readable media having instructions that, when executed by one or more processors, cause an eNB to:
    determine enhanced coverage ("EC") random access ("RA") parameters for a first EC level of a plurality of EC levels;
    generate system information to include the EC RA parameters for the first EC level of the plurality of EC levels;
    determine a window region associated with a repetition level of an RA response, wherein the window region has a plurality of subframes including one or more RA message opportunities, and wherein an RA message opportunity begins at a same subframe as a beginning of the window region and k subframes after an RA message is sent; and
    cause the system information to be transmitted, wherein the EC RA parameters for the first EC level include a frequency hopping configuration associated with the first EC level, and wherein each of the plurality EC levels is associated with a respective frequency hopping configuration.

10. The one or more non-transitory, computer-readable media of claim 9, wherein the EC RA parameters for the first EC level include a number of repetitions for transmitting an RA preamble.

11. The one or more non-transitory, computer-readable media of claim 9, wherein the EC RA parameters for the first EC level include an indication of a size of a window in which the RA response is to be transmitted.

12. The one or more non-transitory, computer-readable media of claim 9, wherein the instructions, when executed, further cause the eNB to:

receive an RA preamble from a user equipment; and transmit the RA response message with an RA-radio network temporary identifier ("RA-RNTI"), the RA-RNTI based on the first EC level and RA preamble time and frequency resources.

13. An apparatus comprising:

memory to store enhanced coverage ("EC") random access ("RA") parameters for a first EC level of a plurality of EC levels; and one or more processors coupled with the memory to:

determine, based at least on the EC RA parameters, a frequency hopping configuration associated with the first EC level, wherein each of the plurality EC levels is associated with a respective frequency hopping configuration:

select, based at least on the EC RA parameters, time and frequency resources;

determine a window region associated with a repetition level of an RA response, wherein the window region has a plurality of subframes including one or more RA message opportunities, and wherein an RA message opportunity begins at a same subframe as a beginning of the window region and k subframes after an RA message is sent; and cause an RA preamble to be transmitted to an eNB using the selected time and frequency resources.

14. The apparatus of claim 13, wherein the one or more processors are further to:

determine, based on the EC RA parameters, the repetition level to be used to transmit the RA preamble; and cause the RA preamble to be transmitted with the repetition level.

15. The apparatus of claim 13, wherein the one or more processors are further to:

determine, based on the first EC level, the repetition level of the RA response message; and monitor a physical downlink control channel to decode the RA response message based on the repetition level.

16. The apparatus of claim 13, wherein the one or more processes are further to:

determine a window based on the EC RA parameters; and monitor a physical downlink control channel within the window to decode the RA response.

17. The apparatus of claim 13, wherein the one or more processors are further to:

process system information to determine the EC RA parameters.

18. The apparatus of claim 13, wherein the one or more processors are further to:

determine an RA-Radio Network Temporary Identifier (RNTI) based on the EC RA parameters; and cause the RA preamble to be retransmitted with the EC level.

19. One or more non-transitory, computer-readable media having instructions that, when executed by one or more processors, cause an eNB to:

determine a first repetition level used to transmit a first random access ("RA") message;

determine, based on the first repetition level, a second repetition level;

determine a window region associated with the first repetition level, wherein the window region has a plurality of subframes including one or more RA message opportunities, and wherein an RA message opportunity begins at a same subframe as a beginning of the window region and k subframes after the first RA message is sent; and transmit a second RA message, in response to the first RA message, with the second repetition level.

20. The one or more non-transitory, computer-readable media of claim 19, wherein the first RA message is a RA preamble and the second RA message is a RA response.

* * * * *